United States Patent [19]

Hsiao

[11] 4,318,099
[45] Mar. 2, 1982

[54] CLUTTER FILTER USING A MINIMUM NUMBER OF RADAR PULSES

[75] Inventor: James K. Hsiao, Oxon Hill, Md.

[73] Assignee: The United States of America as represented by the Secretary of the Navy, Washington, D.C.

[21] Appl. No.: 123,338

[22] Filed: Feb. 21, 1980

[51] Int. Cl.³ ............................................. G01S 13/52
[52] U.S. Cl. .................... 343/5 SW; 343/7.7
[58] Field of Search ............................. 343/5 SW, 7.7

[56] References Cited

U.S. PATENT DOCUMENTS

| | | | |
|---|---|---|---|
| 3,631,490 | 12/1971 | Palmieri | 343/7.7 |
| 3,797,016 | 3/1974 | Martin | 343/7.7 |
| 4,035,799 | 7/1977 | Hsiao | 343/7.7 |
| 4,137,532 | 1/1979 | Taylor, Jr. et al. | 343/7.7 |
| 4,153,899 | 5/1979 | Taylor, Jr. | 343/5 SW X |
| 4,217,584 | 8/1980 | Lombardi et al. | 343/7.7 |

Primary Examiner—Malcolm F. Hubler
Attorney, Agent, or Firm—Robert F. Beers; William T. Ellis; Alan P. Klein

[57] ABSTRACT

A clutter filter which reduces by (N−1) the number of input pulses required for operation of an N-pulse MTI canceler when L>N consecutive filtered outputs are desired. The clutter filter includes the two channels of an N-pulse MTI canceler which weight and sum the in-phase and quadrature-phase components of N radar returns, and a pair of delay circuits which introduce a delay of N interpulse time periods to the N and subsequent in-phase and quadrature-phase components of the radar returns. The stored outputs of the two channels of the canceler and the consecutive outputs of the delay circuits are combined in a complex multiplier to generate the consecutive in-phase and quadrature-phase outputs of the filter. The clutter filter has utility in a multiple-stage filter system employing a Doppler filter as the last stage.

5 Claims, 3 Drawing Figures

CLUTTER FILTER USING A MINIMUM NUMBER OF RADAR PULSES

BACKGROUND OF THE INVENTION

The present invention relates generally to clutter filters, and more particularly to an improved clutter filter for rejecting multiple clutter types in a moving target indication (MTI) radar.

A radar return usually contains both the target signal and a clutter signal. The clutter signal arises from reflections from stationary background objects which usually are much stronger than the target signal. This unwanted clutter, however, can be discriminated against by use of a clutter filter. This type of filter operates on the principle that a moving target has a Doppler frequency shift, but the stationary clutter signal has none. There are two ways to design such a clutter filter. The first way is to design a filter which divides the Doppler frequency space into two regions—a stop-band region and a pass-band region. By properly choosing the width and location of the filter's stop-band regions, one can effectively eliminate the clutter noise to an acceptable level. This type of filter is generally referred to as an MTI canceler. The second type is a filter which divides the Doppler frequency space into many regions. Each filter output responds to one of these narrow bands. This type of filter is generally referred to as a Doppler filter and is formed by a FFT (Fast Fourier Transform) network. This filter not only can be used to discriminate against the unwanted clutter, it can also be used to resolve the target Doppler frequency and provide improvement against noise. However, in many practical cases, neither of these two types of filter is adequate. For example, if the radar returns contain moving clutter of different types, each having a different Doppler frequency characteristic, it is evident that a simple MTI canceler would not be enough to achieve the required clutter rejection level. Theoretically, this type of clutter may be handled by a multiple-band (FFT) filter. However, due to the limitation of sidelobe level, a Doppler filter usually has a low improvement factor. Sometimes, this improvement factor may not be enough to reject a strong clutter signal. To alleviate this problem, it has been proposed that a multiple-stage filter connected in cascade be used. For example, the paper "Technical Note 1972-14" 1972, pp. 1-16, by R. McAulay discloses that one may use a MTI canceler followed by a Doppler filter. Or, one may use several stages of MTI cancelers. Each stage is used for filtering a particular type of clutter.

In a radar system, the number of pulses to be used for coherent filtering is always limited due to the data rate, the requirement of frequency agility and other considerations. However, in general, the proposed multiple-stage filter requires many radar pulses because the total number of pulses required is approximately equal to the sum of the number of pulses required in each stage.

SUMMARY OF THE INVENTION

It is therefore one object of the present invention to provide an improved clutter filter.

It is another object of the invention to improve a clutter filter by reducing the number of pulses required for operation of a multiple-stage filter system without affecting the performance thereof.

The objects of the present invention are achieved in an improved clutter filter by reducing by (N−1) the number of input pulses required for operation of an N-pulse MTI canceler when L>N consecutive filtered outputs are desired.

In an illustrative embodiment of the invention, the clutter filter comprises the two channels of an MTI canceler which weight and sum the in-phase and quadrature-phase components of N radar returns and a pair of delay circuits which introduce a delay of N interpulse time periods to the N and subsequent in-phase and quadrature-phase components of the radar returns. The stored output of the cancelers and the consecutive outputs of the delay circuits are combined in a complex multiplier to generate the consecutive in-phase and quadrature-phase outputs of the filter. The clutter filter has utility in a multiple-stage filter system employing a Doppler filter as its last stage.

In another embodiment of the invention, a second stage of filtering is added to the circuit previously described.

The foregoing as well as other objects, features and advantages of the present invention will become more apparent from the following detailed description when taken in conjunction with the appended drawings.

DESCRIPTION OF THE PREFERRED EMBODIMENT

Figure 1:
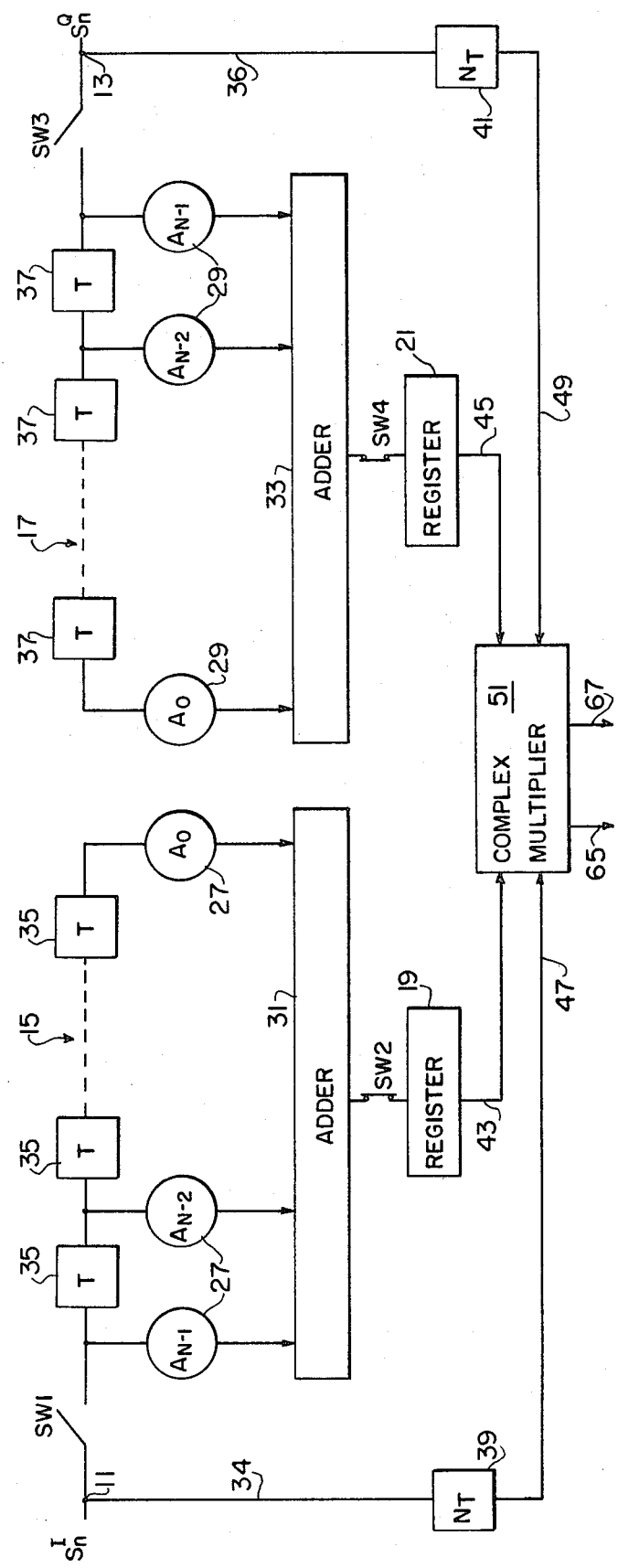
FIG. 1 is a block schematic diagram of a first embodiment of the clutter filter of this invention.

Before entering into the detailed description of one embodiment of the present invention according to the accompanying FIG. 1 of the drawing, the theory of the present invention will be explained in detail hereinafter.

Consider, for example, a conventional coherent pulse radar transmitting a train of pulses with a fixed interpulse time period of T. The return from one range resolution cell can be represented as $$S_n = s_o \exp[j(2\pi n f T)] \quad (1)$$

where f is the target Doppler frequency, $s_o$ the amplitude of the return signal and n the subscript for the nth return.

It will be assumed that the target and clutter signals vary at random and slowly in comparison to the radar sampling time. In other words, during the time interval in which the radar pulses are transmitted and received, the returns, except for a constant Doppler frequency shift, remain unchanged. This may be justified by considering that the radar return consists of reflections from a large number of small individual scatterers. Each scattering point may move randomly, but the target or clutter also moves as a whole at a certain velocity which yields a constant Doppler frequency. The phase and amplitude of the scattered return signals is the expected value of the contribution of each of the large number of point scatterers. Since these point scatterers vary slowly in comparison to the radar sampling time and are assumed statistically stationary, the returns on the average maintain a constant amplitude and a constant Doppler frequency.

Figure 2:
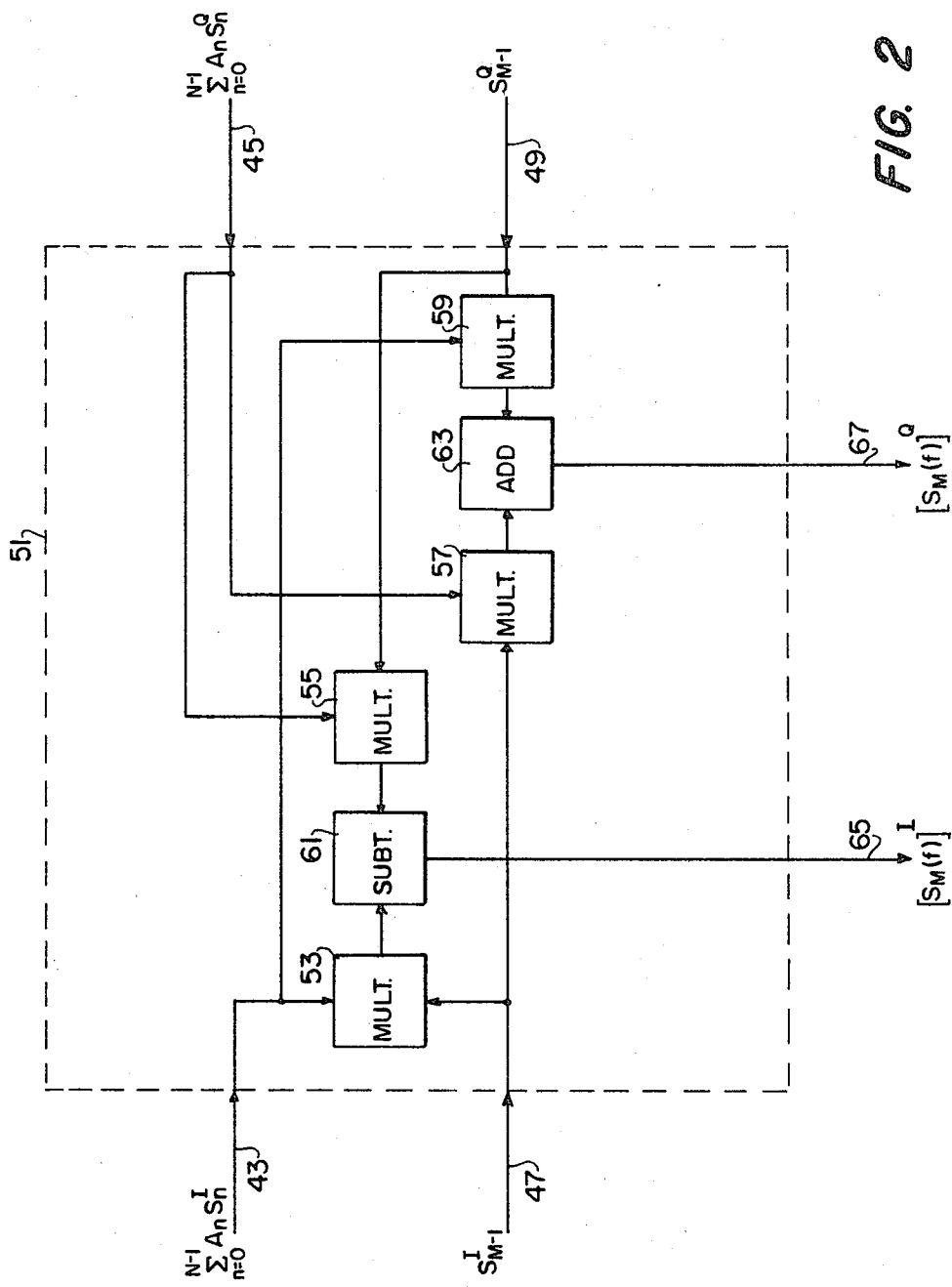
FIG. 2 is a schematic circuit diagram of the complex multiplier.

In the prior art, as exemplified by FIG. 2 of U.S. Pat. No. 3,797,016 issued Mar. 12, 1974 to R. G. Martin, an N-pulse MTI canceler is used to reject stationary clutter by canceling the components of the returns at zero Doppler frequency. In operation, N consecutive returns, i.e., $S_0, S_1, S_2 \ldots S_{N-1}$, are weighted and summed to provide a first output $$S_1(f) = \sum_{n=0}^{N-1} c_n S_n \qquad (2)$$
$$= \sum_{n=0}^{N-1} c_n \exp[j(2\pi\ nfT)]$$

where $c_n$ is the weight applied for each of the N returns $S_n$, and $s_o$ is normalized to unity. The $c_n$'s are taken to be real such that $c_n = A_n$ so that equation (2) can be rewritten as:

$$S_1(f) = \sum_{n=0}^{N-1} A_n(S_n^I + jS_n^Q) \qquad (3)$$

where
$$S_n^I = \cos(2\pi nfT)$$
$$S_n^Q = \sin(2\pi nfT)$$

In the equation, the first summation term (cosine term) represents the output of the I (in-phase) channel, while the second summation term (sine term) represents the output of the Q (quadrature-phase) channel and is implemented as two identical channels. The set of coefficients $A_n$ is selected such that the output at zero Doppler frequency $f=0$, i.e., $|S_1(0)|^2$, is minimized. As explained above, this type of filter cannot achieve the required clutter rejection level when the radar returns include moving clutter having non-zero Doppler frequencies. Accordingly, it has been proposed that the returns be further filtered by providing the consecutive filtered outputs of the MTI canceler to a Doppler filter having a Fourier transform network. The Doppler filter resolves the returns into a plurality of Doppler frequency components so that frequency components corresponding to clutter can be stopped. An exemplary Doppler filter is disclosed at p. 422 of the text "Radar Design Principles" by F. E. Nathanson, McGraw Hill, 1969. In general, in order to obtain L Doppler frequency components, L consecutive outputs of the form $$S_m(f) = \sum_{n=0}^{N-1} c_n S_{n+m-1} \qquad (4)$$
$$= \sum_{n=0}^{N-1} c_n \exp[j2\pi(n+m-1)fT]$$

must be obtained from the N-pulse MTI canceler and applied to the Doppler filter. Here m is the subscript for the mth output and varies from 1 to L. The first output is given by equation (2) above. It is assumed that L is an integer greater that N. For example, consider a 3-pulse canceler (N=3) followed by a Doppler filter having 8 frequency components (L=8). Then, 8 successive outputs of the form $S_m(f)$ must be obtained from the 3-pulse canceler and applied to the Doppler filter. The first output $S_1(f)$ is obtained by weighting and summing returns 0, 1, 2. The second output $S_2(f)$ is obtained by weighting and summing returns 1, 2, 3. The eighth output $S_8(f)$ is obtained by weighting and summing returns 7, 8, 9. Since N returns are required to generate each output $S_m(f)$ of the N-pulse MTI canceler, the total number of returns required to generate the L outputs is $N+L-1$. In the above example, the total number of returns required is $3+8-1=10$.

According to the present invention, an improved clutter filter has been developed to be used, in place of the MTI canceler of the prior art, in cascade with the Doppler filter such that L outputs of the form $S_m(f)$ can be obtained from only L returns. This permits the number of pulses required to generate the L outputs to be reduced by $(N-1)$. In the above example, the improved clutter filter used in place of the MTI canceler of the prior art provides eight successive outputs of the form $S_m(f)$ from returns 0, 1, 2, . . . . 7, so that the total number of pulses required for operation of the multiple stage filter is only 8 i.e., two less than required by the N-pulse canceler.

In understanding the structure of the invention, it is noted that the radar returns $S_n$ are all identical except that they differ by a constant phase angle. Therefore the $(m-1)$th return differs from the 0th return only by a constant phase angle $\exp j[2\pi(m-1)fT]$. Accordingly, one can rewrite equation (4) in the form $$S_m(f) = \exp\{j[2\pi(m-1)fT]\} \cdot \sum_{n=0}^{N-1} c_n \exp[j(2\pi nfT)] \qquad (6)$$

It will be readily appreciated that the first factor on the right hand side of equation (6) is just the representation of the $(m-1)$th return, and the second factor on the right hand side of equation (6) is just the weighted sum of the first N returns (as expressed in equation (2) above). Thus, L outputs of the form $S_m(f)$ can be obtained by multiplying each of the first L returns by the weighted sum of the first N returns. In the above example, 8 outputs of the form $S_m(f)$ can be obtained by multiplying each of the returns 0, 1, 2, . . . . 7, by the weighted sum of returns 0, 1, 2.

In terms of the I and Q channels of the radar returns, equation (6) becomes $$S_m(f) = (S_{m-1}^I + jS_{m-1}^Q) \cdot \sum_{n=0}^{N-1} A_n(S_n^I + jS_n^Q) \qquad (7)$$

$$= \left[ S_{m-1}^I \cdot \sum_{n=0}^{N-1} A_n S_n^I - S_{M-1}^Q \cdot \sum_{n=0}^{N-1} A_n S_n^Q \right] + \qquad (8)$$

$$j \left[ S_{m-1}^Q \cdot \sum_{n=0}^{N-1} A_n S_n^I + S_{m-1}^I \cdot \sum_{n=0}^{N-1} A_n S_n^Q \right]$$

$$= [S_m(f)]^I + j[S_m(f)]^Q \qquad (9)$$

Referring to FIG. 1, there is shown a block schematic diagram of a first embodiment of the improved clutter filter of the invention as would be used in cascade with a conventional Doppler filter and which digitally implements equation (8). A series of phase-detected radar returns in digital form is received at input terminals 11 and 13. The radar returns are represented as digital inputs $S_n^I$, $S_n^Q$ which in turn represent the I (in-phase) and 0 (quadrature-phase) components of the radar returns. Not shown is a circuit for providing the inputs $S_n^I$, $S_n^Q$. Such a circuit may conveniently comprise a conventional quadrature hybrid circuit to split the radar returns into their I and Q components, and a pair of analog-to-digital (A/D) converters to convert the I and Q components to digital form.

Canceling means which may comprise the two channels 15 and 17 of a canceler of the type shown in FIG. 2 of the above-referenced U.S. Pat. No. 3,797,016 weights and sums the phase-detected radar returns. First and second switching means, which may comprise respective pairs of switches SW 1, SW 3 and SW 2, SW 4, selectively couple the canceler channels 15 and 17 to the input terminals 11 and 13 or to store means which may comprise registers 19 and 21. In operation, the switches SW 1 and SW 3 are closed during the receipt of N consecutive returns to feed the phase-detected components of the radar returns to the canceler channels 15 and 17, and opened thereafter. The switches SW 2 and SW 4 are opened during the receipt of the N consecutive returns, and are closed thereafter for a short interval (of the order of half an interpulse time period) to feed the outputs of the canceler channels 15 and 17 to the registers 19 and 21.

Each canceling means (e.g., 15) is composed of delay means, which may comprise N cascaded delay lines 35 (or N cascaded delay lines 37) for introducing successive delays to the phase-detected radar returns equal to one interpulse time period T; multiplying means, which may comprise multipliers 27 (or 29) for multiplying each of the successively delayed returns by selected coefficients $A_0$ to $A_{N-1}$; and summing means, which may comprise adders 31 (or 33) for summing the multiplied returns.

The phase-detected radar returns received at the input terminals 11 and 13 are also coupled to delay means, which may comprise delay circuits 39 and 41, for introducing a delay of NT to each of the returns. The registers 19 and 21 and the delay circuits 39 and 41 are each coupled on lines 43, 45, 47, 49 respectively, to a conventional complex multiplier 51 which is shown in detail in FIG. 2. The complex multiplier 57 consists of four real multipliers 53, 55, 57, 59 a subtractor 61, and an adder 63. Real multiplier 53 receives inputs from register 19 and delay circuit 39. The output of this unit is connected to one input of the subtractor 61 which has its other input connected to real multiplier 55 which receives its inputs from register 21 and delay circuit 41. The output of the subtractor on line 65 is the I (in-phase) output of the clutter filter. Real multiplier 59 receives inputs from register 19 and delay circuit 41. The output of this unit is connected to one input of adder 63 which has its other input connected to real multiplier 57 which receives its inputs from register 21 and delay circuit 39. The output of the adder on line 67 is the Q (quadrature-phase) output of the clutter filter. When connected as shown, the devices form a circuit which digitally implements equation (8) to provide L outputs of the form $S_m(f)$ from only L returns, i.e., with $(N-1)$ less pulses then required by an N-pulse canceler.

Figure 3:
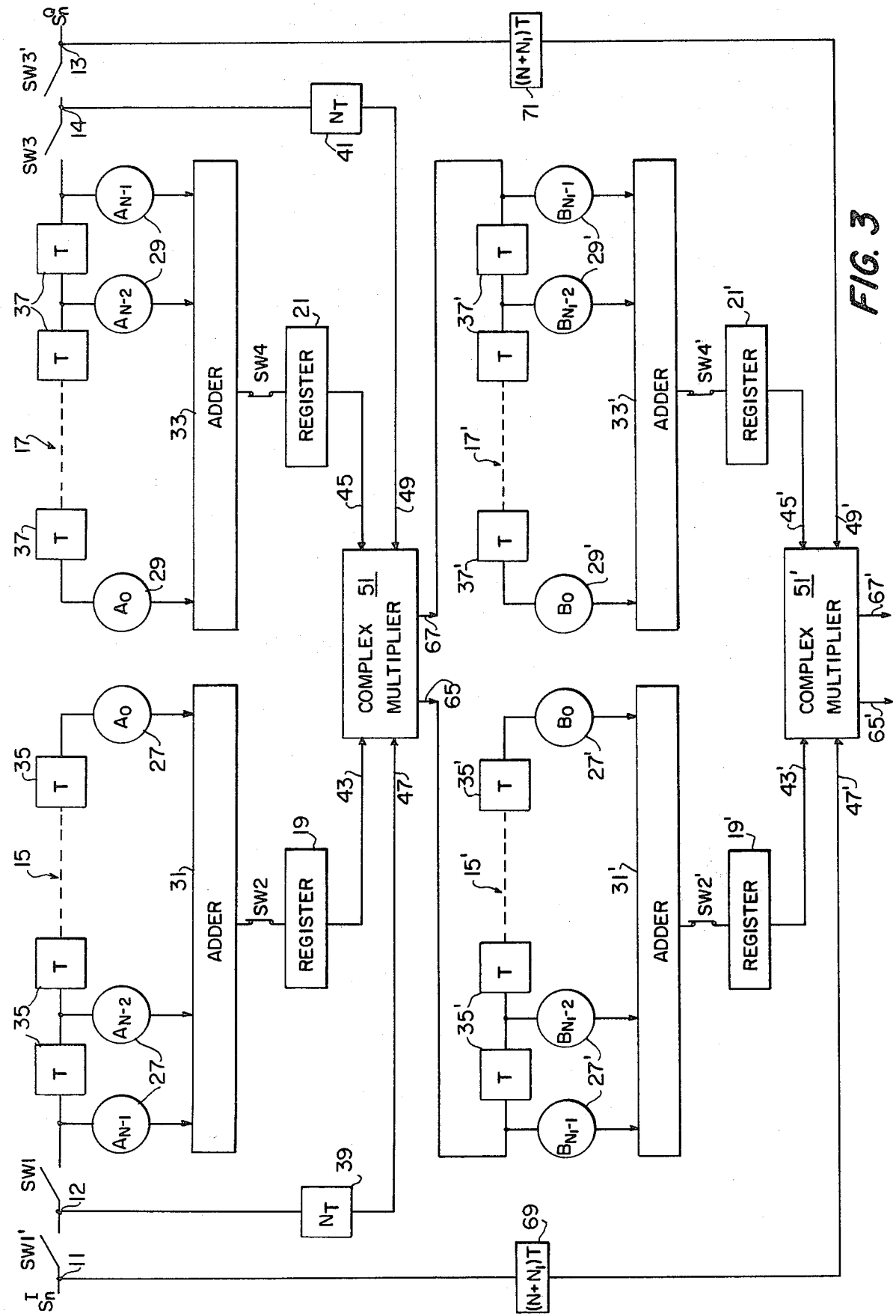
FIG. 3 is a block schematic diagram of a second embodiment of the clutter filter of this invention.

Referring to FIG. 3, there is shown a second embodiment of the improved clutter filter of the invention wherein a second stage of filtering has been added to the circuit of FIG. 1. As shown, first and second switching means, which may comprise respective pairs of switches SW 1, SW 3, and SW 2, SW 4, selectively couple the canceler channels 15 and 17 of the first stage to nodes 12 and 14 or to the registers 19 and 21. The I and Q outputs of the complex multiplier 51 are coupled on leads 65 and 67 to the second-stage canceling means, which may comprise canceler channels 15' and 17'. This canceling means differs from the corresponding element of the first stage in the number, $N_1$, of the delay lines 35' and 37', and the selected coefficients $B_0$ to $B_{N_1-1}$ of the multipliers 27' and 29'. Third and fourth switching means, which may comprise respective pairs of switches SW'$_1$, SW'$_3$ and SW$_2$', SW$_4$' selectively couple the pair of nodes 12 and 14 to the input terminals 11 and 13, or the cancelers 15' and 17' to store means, which may comprise registers 19' and 21'. Delay means, which may comprise delay circuits 69 and 71, is coupled to the input terminals 11 and 13 for introducing a delay of $(N+N_1)T$ to each return. The delay circuits 45 and 47, and the registers 19' and 21' are each coupled to a complex multiplier 51' of the type shown in FIG. 2.

In operation, switches SW$_1$' and SW$_3$' are closed during the receipt of $(N+N_1)$ consecutive returns to feed the returns to the switch means of the first stage, and are opened thereafter. Switches SW$_2$' and SW$_4$' are opened during the receipt of the $(N+N_1)$ consecutive returns and are closed thereafter for a short interval (of the order of half an interpulse time period) to feed the output of the canceler channels 15' and 17' to the registers 19' and 21'. When constructed as shown, the devices form a circuit which provides L outputs for application to a Doppler filter from only L returns i.e., with $(N+N_1-2)$ less pulses than required by an N-pulse canceler and an $N_1$-pulse canceler in cascade.

Obviously, numerous modifications and variations of the present invention are possible in light of the above teachings. For example, to cancel the clutter in each stage of the clutter filter one can use the digital Doppler compensation scheme described in commonly assigned U.S. Pat. No. 4,035,799 issued July 12, 1977 to J. K. Hsiao. It is therefore to be understood that, within the scope of the appended claims, the invention may be practiced otherwise than as specifically described herein.

What is claimed and desired to be secured by Letters Patent of the United States is:

1. A clutter filter using a minimum number of radar pulses, comprising:
input means for receiving a series of phase-detected radar returns in digital form, the radar returns having a fixed interpulse time period;
canceling means for weighting and summing N of the phase-detected radar returns to cancel clutter signals, where N is an integer;
store means;
first switching means for connecting the canceling means to the input means during receipt of the N returns and disconnecting the canceling means from the input means thereafter;
second switching means for disconnecting the canceling means from the store means during receipt of the N returns and connecting the canceling means to the store means for an interval less than the interpulse time period thereafter;
first delay means coupled to the input means for introducing a delay equal to N interpulse time periods to each of the phase-detected radar returns; and
a complex multiplier connected to the store means and to the first delay means for generating more than N filtered outputs with $(N-1)$ less pulses than required by an N-pulse canceler.

2. The clutter filter recited in claim 1 wherein the canceling means includes:
second delay means coupled to the switching means for introducing successive delays equal to the fixed interpulse time period to the N phase-detected radar returns;

multiplying means coupled to the second delay means for multiplying the successively delayed N phase-detected radar returns by selected coefficients; and summing means coupled to the multiplying means for summing the multiplied N phase-detected radar returns.

3. A clutter filter using a minimum number of radar pulses, comprising:

input means for receiving a series of phase-detected radar returns in digital form, the radar returns having a fixed interpulse time period;

first canceling means for weighting and summing N of the phase-detected radar returns to cancel clutter signals, where N is an integer;

first store means;

a pair of nodes;

first switching means for connecting the first canceling means to the pair of nodes during receipt of the N returns and disconnecting the first canceling means from the pair of nodes thereafter;

second switching means for disconnecting the first canceling means from the first store means during receipt of the N returns and connecting the first canceling means to the first store means for an interval less than the interpulse time period thereafter;

first delay means coupled to the pair of nodes for introducing a first delay equal to N interpulse time periods to each of $N+N_1$ of the phase-detected radar returns, where $N+N_1$ is an integer;

a first complex multiplier connected to the first store means and the first delay means for generating $N_1$ outputs;

second canceling means coupled to the first complex multiplier for weighting and summing the $N_1$ outputs of the first complex multiplier;

second store means;

third switching means for connecting the pair of nodes to the input means during receipt of $N+N_1$ returns and disconnecting the pair of nodes from the input means thereafter;

fourth switching means for disconnecting the second canceling means from the second store means during receipt of $N+N_1$ returns and connecting the second cancelling means to the second store means for an interval less than the interpulse time period thereafter;

second delay means coupled to the input means for introducing a delay equal to $(N+N_1)$ interpulse time periods to each of the phase-detected radar returns;

a second complex multiplier connected to the second store means and to the second delay means for generating more than $(N+N_1)$ filtered outputs with $(N+N_1-2)$ less pulses than required by an N-pulse canceler and an $N_1$-pulse canceler in cascade.

4. The clutter filter recited in claim 3 wherein the first canceling means includes:

third delay means coupled to the first switching means for introducing successive delays equal to the fixed interpulse time period to the N phase-detected radar returns;

multiplying means coupled to the third delay means for multiplying the successively delayed N phase-detected radar returns by selected coefficients; and summing means coupled to the multiplying means for summing the multiplied N phase-detected radar returns.

5. The clutter filter recited in claim 3 wherein the second canceling means includes:

third delay means coupled to the first complex multiplier for introducing successive delays equal to the fixed interpulse time period to the $N_1$ outputs of the first complex multiplier;

multiplying means coupled to the third delay means for multiplying the successively delayed $N_1$ outputs of the first complex multiplier by selected coefficients; and summing means coupled to the multiplying means for summing the $N_1$ outputs of the first complex multiplier.

* * * * *